(12) United States Patent
Matsuoka et al.

(10) Patent No.: US 11,965,820 B2
(45) Date of Patent: Apr. 23, 2024

(54) REACTION VESSEL FOR AUTOMATIC ANALYZER

(71) Applicant: Hitachi High-Tech Corporation, Tokyo (JP)

(72) Inventors: Yuya Matsuoka, Tokyo (JP); Eiichiro Takada, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 701 days.

(21) Appl. No.: 17/275,291

(22) PCT Filed: Jun. 20, 2019

(86) PCT No.: PCT/JP2019/024425
§ 371 (c)(1),
(2) Date: Mar. 11, 2021

(87) PCT Pub. No.: WO2020/066165
PCT Pub. Date: Apr. 2, 2020

(65) Prior Publication Data
US 2022/0042902 A1  Feb. 10, 2022

(30) Foreign Application Priority Data

Sep. 27, 2018 (JP) .................. 2018-181229

(51) Int. Cl.
*G01N 1/00* (2006.01)
*G01N 21/03* (2006.01)
(Continued)

(52) U.S. Cl.
CPC ......... *G01N 21/0332* (2013.01); *G01N 21/31* (2013.01); *G01N 35/00* (2013.01); *G01N 2035/00356* (2013.01)

(58) Field of Classification Search
None
See application file for complete search history.

(56) References Cited

U.S. PATENT DOCUMENTS 3,627,432 A  12/1971  Bergmann
4,427,634 A   1/1984  Truglio
(Continued)

FOREIGN PATENT DOCUMENTS

CH    493 834 A    7/1970
CN    105413599 A  3/2016
(Continued)

OTHER PUBLICATIONS

Office Action, dated Dec. 12, 2023, for Brazilian Application No. BR112021004605-4 (with English translation).
(Continued)

*Primary Examiner* — Jyoti Nagpaul
(74) *Attorney, Agent, or Firm* — BAKER BOTTS L.L.P.

(57) ABSTRACT

A reaction vessel capable of measuring a light amount from a reaction liquid without degrading a function of maintaining the reaction vessel at a predetermined temperature is provided. A reaction vessel including a cylindrical shape centered on a first axis, in which an overall length in a first axis direction is longer than an overall length in a second axis direction and an overall length in a third axis direction, the second axis being perpendicular to the first axis and the third axis being perpendicular to the first axis and the second axis. The reaction vessel includes: an opening part which dispenses a liquid at a portion on one end side in the first axis direction; a first flat surface and a second flat surface which is substantially parallel to the first flat surface.

19 Claims, 7 Drawing Sheets

(51) Int. Cl.
*G01N 21/31* (2006.01)
*G01N 35/00* (2006.01)

(56) References Cited

U.S. PATENT DOCUMENTS

| | | |
|---|---|---|
| 5,272,092 A | 12/1993 | Hamasaki et al. |
| 5,658,532 A | 8/1997 | Kurosaki et al. |
| 2005/0095172 A1 | 5/2005 | Nagaoka et al. |
| 2008/0019868 A1 | 1/2008 | Okumoto et al. |
| 2008/0248586 A1 | 10/2008 | Tajima |
| 2014/0050619 A1 | 2/2014 | Meller |
| 2014/0220705 A1 | 8/2014 | Yogi et al. |
| 2016/0103061 A1 | 4/2016 | Weber |

FOREIGN PATENT DOCUMENTS

| | | |
|---|---|---|
| EP | 1 909 094 A1 | 4/2008 |
| JP | 1-229974 A | 9/1989 |
| JP | 9-101302 A | 4/1997 |
| JP | 10-325838 A | 12/1998 |
| JP | 2014-79194 A | 5/2014 |
| JP | 2014-119382 A | 6/2014 |
| JP | 6245883 B2 | 12/2017 |
| WO | WO 2017/015640 A1 | 1/2017 |

OTHER PUBLICATIONS

Office Action, dated Sep. 5, 2023, for Chinese Application No. 201980055122.1 (with English translation).
Extended European Search Report, dated May 2, 2022, for European Application No. 19864267.0.
International Search Report, dated Sep. 10, 2019, for International Application No. PCT/JP2019/024425.
Written Opinion of the International Preliminary Examining Authority [PCT/IPEA/408] (in Japanese language).

[FIG. 1]
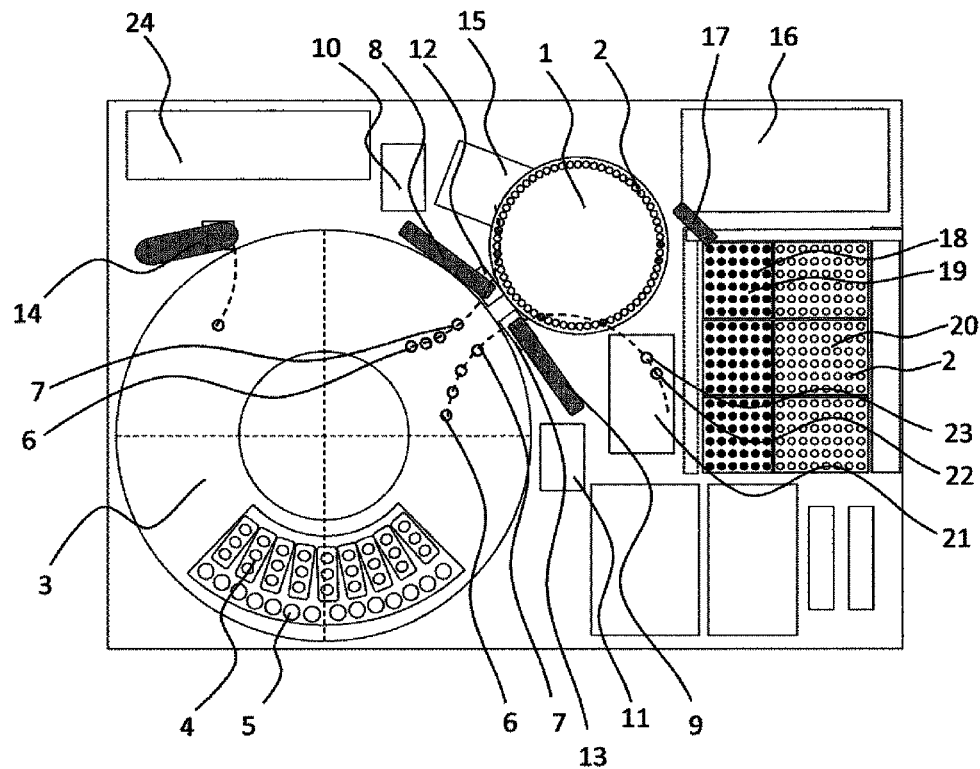
[FIG. 2]
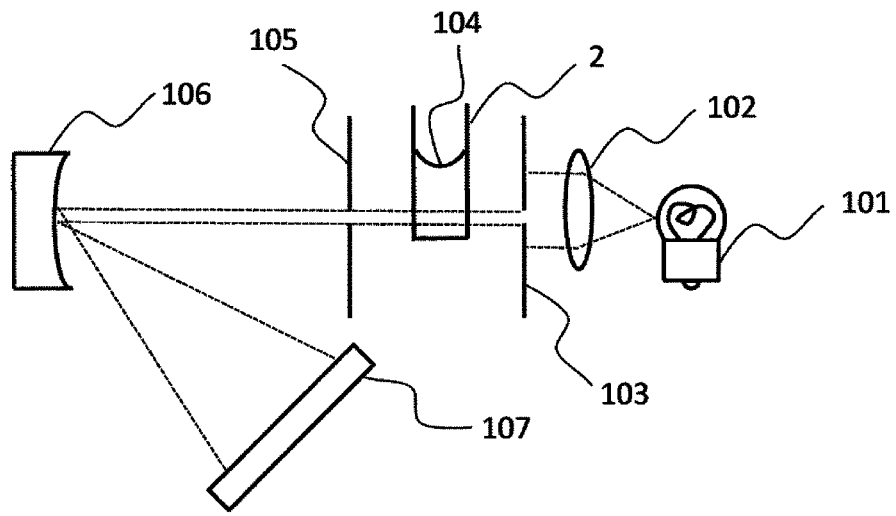

[FIG. 3]
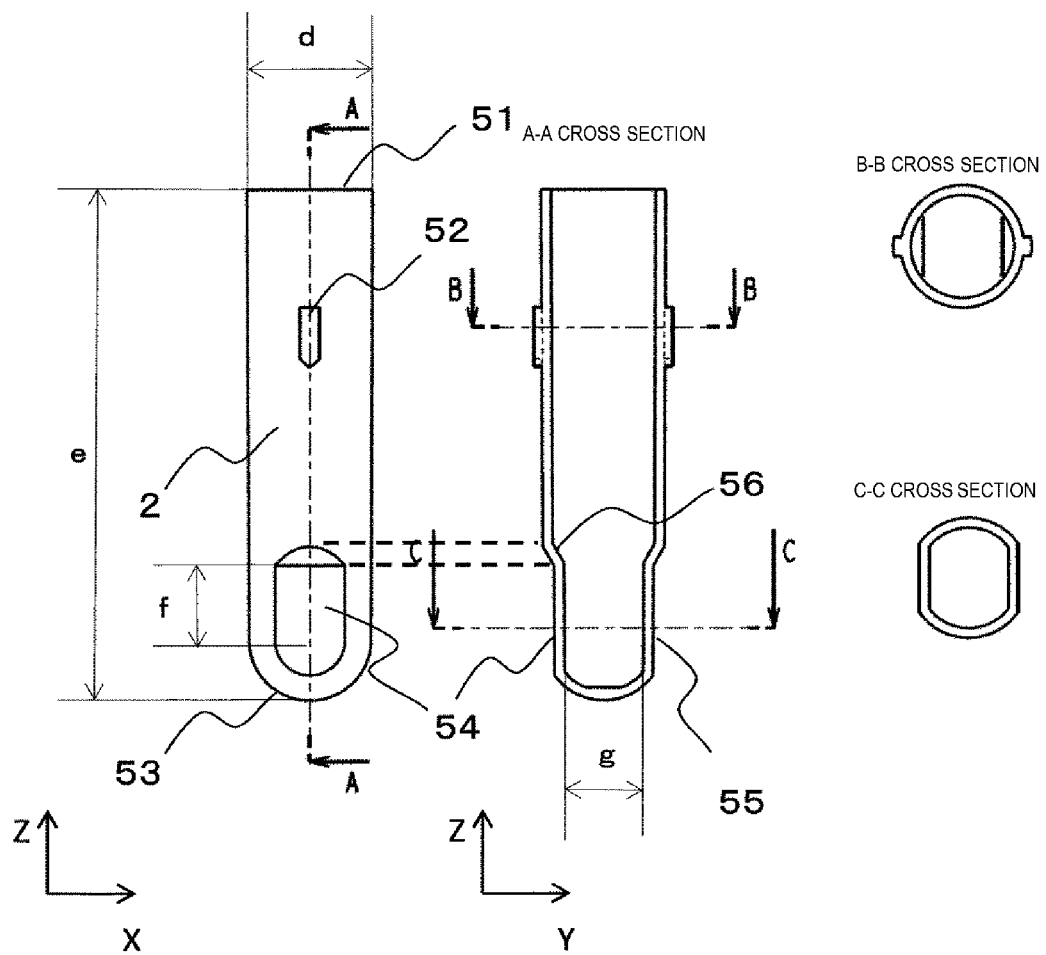

[FIG. 4]
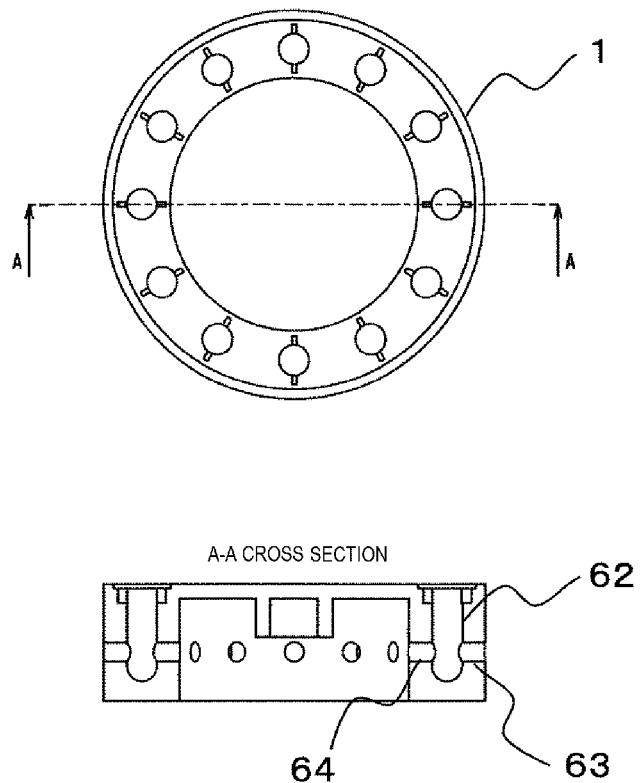
[FIG. 5]
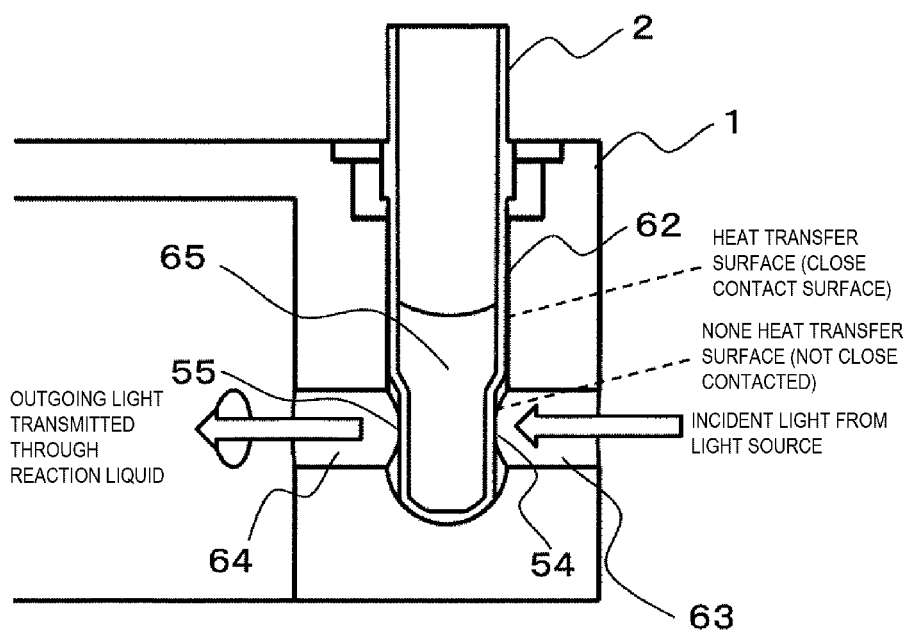

[FIG. 6]
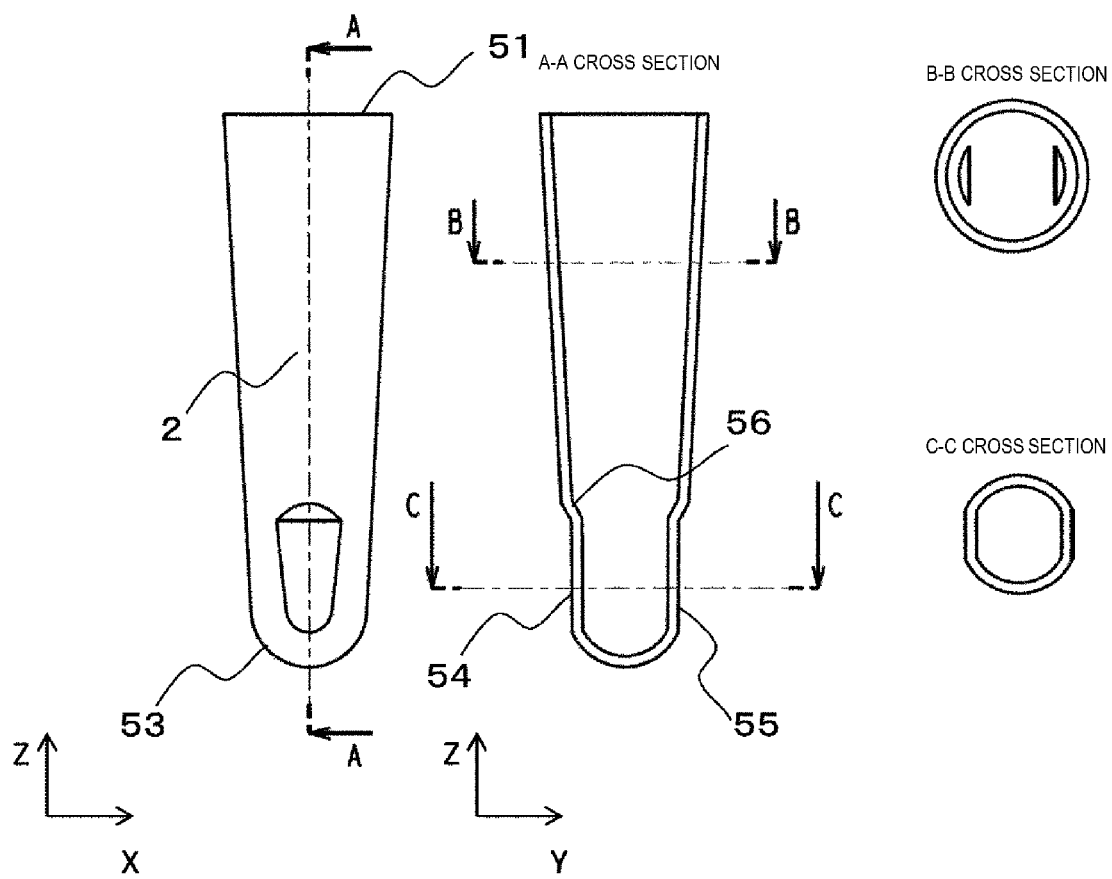

[FIG. 7]
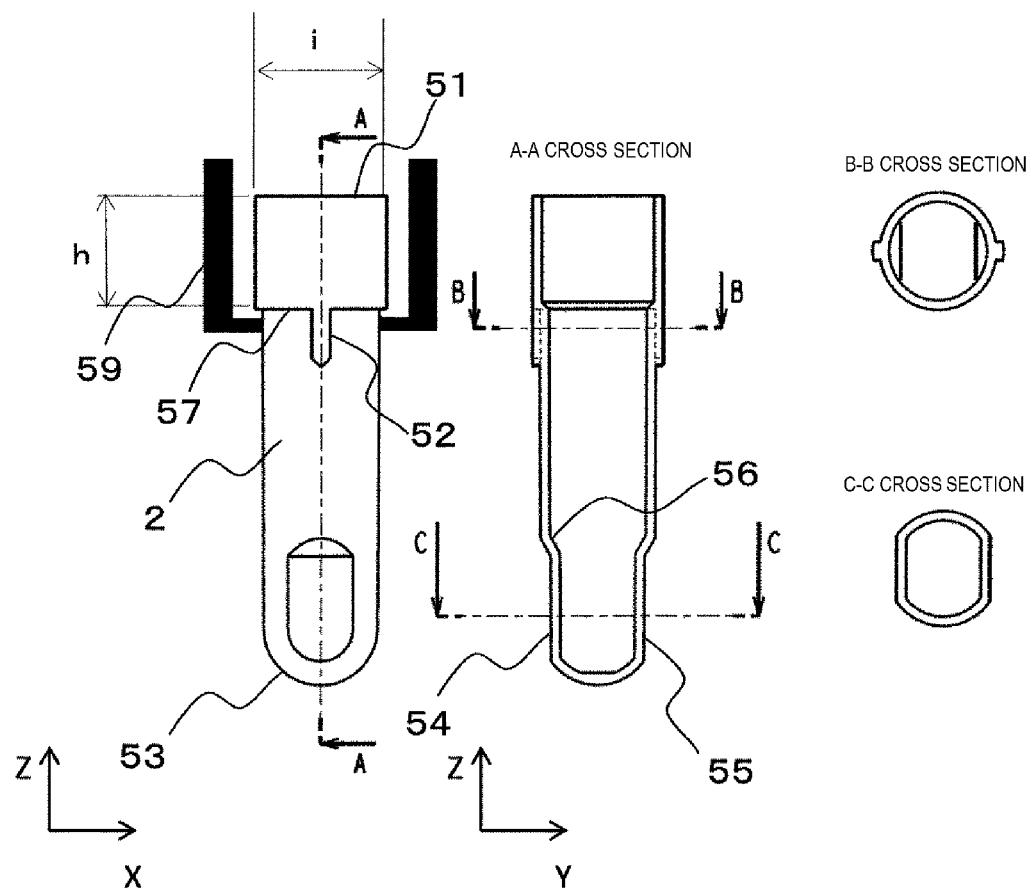

[FIG. 8]
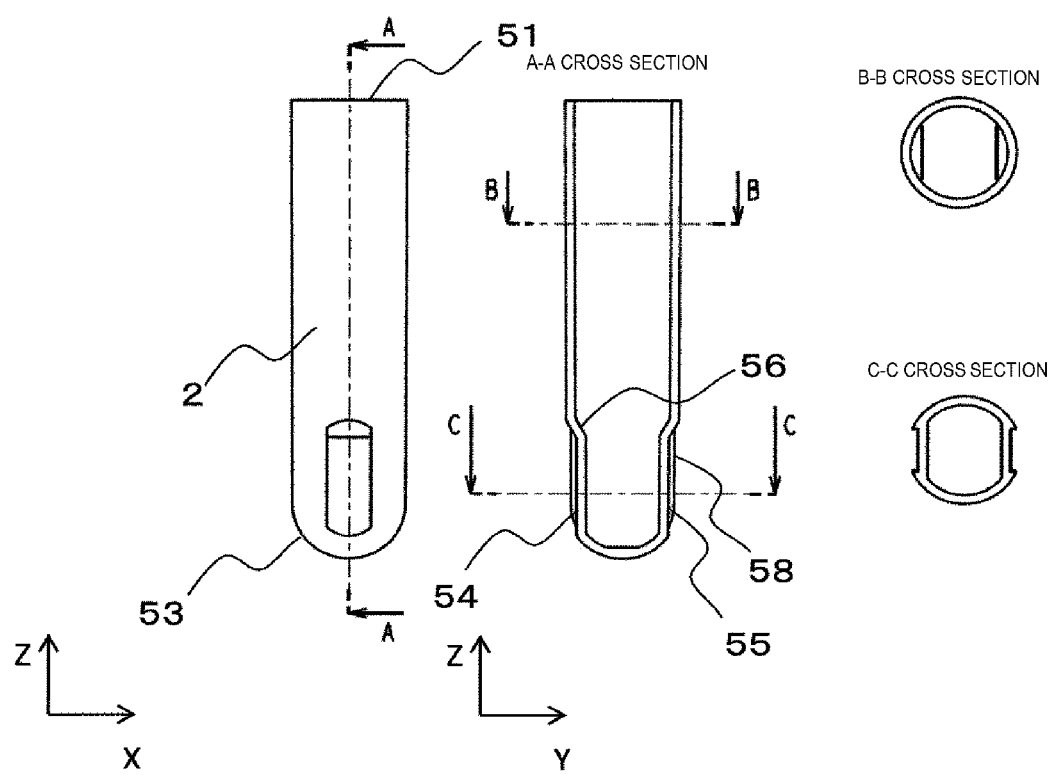

[FIG. 9]
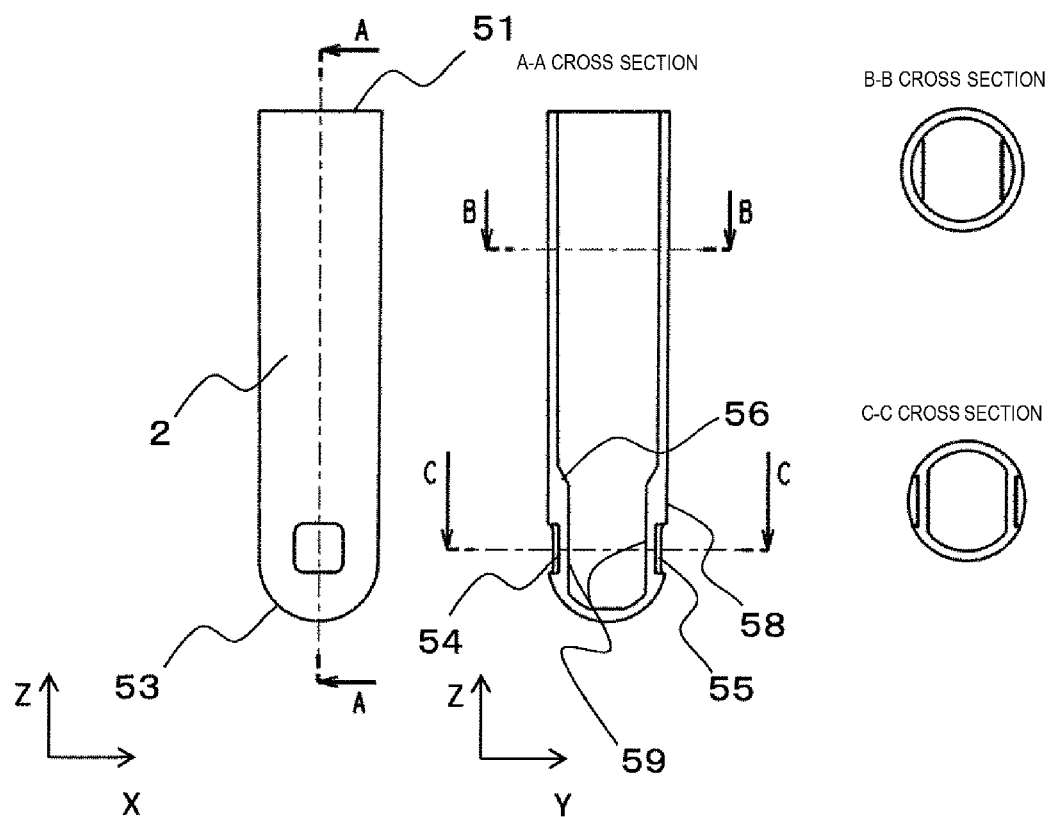

REACTION VESSEL FOR AUTOMATIC ANALYZER

TECHNICAL FIELD

The present disclosure relates to a reaction vessel for an automatic analyzer.

BACKGROUND ART

Recently, there has been a composite automatic analyzer in which analysis methods of a biochemical automatic analyzer and an immunoautomatic analyzer are aggregated into one analysis method. The biochemical automatic analyzer measures a light amount of transmitted light or scattered light obtained by irradiating a reaction liquid in which a specimen and a reagent are mixed in a reaction vessel with light. The immunoautomatic analyzer causes a reagent to which a labeled body is added to react with a specimen, and measures an emitted light amount of the labeled body. A reaction vessel used in this composite automatic analyzer has also been studied (see PTL 1 and PTL 2).

CITATION LIST

Patent Literature

PTL 1: Japanese Patent No. 6,245,883
PTL 2: JP-A-10-325838

SUMMARY OF INVENTION

Technical Problem

In the composite automatic analyzer described above, it is desirable that a reaction liquid in a reaction vessel can be irradiated with light to measure a light amount of transmitted light or scattered light while the reaction vessel is maintained at a predetermined temperature. On the other hand, in a reaction vessel of PTL 1 and PTL 2, a shape for measuring a light amount is considered, but a shape appropriate for maintaining the reaction vessel at a predetermined temperature is not considered.

Therefore, an object of the invention is to provide a reaction vessel capable of measuring a light amount from a reaction liquid without degrading a function of maintaining the reaction vessel at a predetermined temperature.

Solution to Problem

A reaction vessel for an automatic analyzer according one aspect of the invention has a cylindrical shape centered on a first axis, in which an overall length in a first axis direction is longer than an overall length in a second axis direction and an overall length in a third axis direction, the second axis being perpendicular to the first axis and the third axis being perpendicular to the first axis and the second axis. The reaction vessel includes: an opening part which dispenses a liquid at a portion on one end side in the first axis direction; a first flat surface which has one side extending in the first axis direction and the other side extending in the second axis direction from a portion on the other end side in the first axis direction; and a second flat surface which is substantially parallel to the first flat surface at a portion facing the first flat surface in the third axis direction, in which portions on side surfaces of the first flat surface and the second flat surface are formed to bend in a direction toward an outer side of the reaction vessel, and a length of the first flat surface and the second flat surface in the first axis direction is less than half the overall length in the first axis direction.

Advantageous Effect

According to the present invention, a reaction vessel capable of measuring a light amount from a reaction liquid without degrading a function of maintaining the reaction vessel at a predetermined temperature is provided.

BRIEF DESCRIPTION OF DRAWINGS

FIG. 1 is a view showing an overall configuration of an automatic analyzer.
FIG. 2 is a view showing an optical system of the automatic analyzer.
FIG. 3 is a schematic view of a reaction vessel.
FIG. 4 is a schematic view of an incubator.
FIG. 5 is a view showing a relationship between the incubator and the reaction vessel.
FIG. 6 is a schematic view of the reaction vessel.
FIG. 7 is a schematic view of the reaction vessel.
FIG. 8 is a schematic view of the reaction vessel.
FIG. 9 is a schematic view of the reaction vessel.

DESCRIPTION OF EMBODIMENTS

Hereinafter, an embodiment will be described with reference to the drawings.

FIG. 1 is a view showing an overall configuration of an automatic analyzer. A plurality of reaction vessels 2 are arranged on a circumference of an incubator 1. The reaction vessel 2 is common to all reactions and is disposable. A driving mechanism such as a motor is controlled to rotationally drive the incubator 1 over a distance corresponding to a predetermined number of reaction vessels in one cycle.

A plurality of reagent bottles 4 and a plurality of specimen containers 5 can be placed on a circumference of a reagent/specimen common disc 3 (hereinafter referred to as "disc"). In this embodiment, the reagent bottles 4 are positioned on an inner circumference of the specimen containers 5, but the specimen containers 5 may be positioned on an inner circumference of the reagent bottles 4, or may be positioned without being divided between an inner circumference and an outer circumference.

A first dispensing mechanism 8 and a second dispensing mechanism 9, which are rotatable and vertically movable, are installed between the incubator 1 and the disc 3, and each of the first dispensing mechanism 8 and the second dispensing mechanism 9 includes a dispensing nozzle. Pumps 10 and 11 are connected to the dispensing nozzles, respectively.

The first dispensing mechanism 8 and the second dispensing mechanism 9 are properly used for examinations in different analysis processes. When the first dispensing mechanism 8 is used for biochemistry and the second dispensing mechanism 9 is used for immunity, the second dispensing mechanism 9 for immunity is highly required to prevent contamination between specimens, and therefore a dispensing tip 18 is used. The first dispensing mechanism 8 dispenses a specimen and a reagent for a biochemical examination. The second dispensing mechanism 9 dispenses a specimen and a reagent for an immunological examination. Both the first dispensing mechanism 8 and the second dispensing mechanism 9 are accessible for a specimen for which both the biochemical examination and the immunological examination are performed.

The dispensing nozzle is moved while drawing a circular arc around a rotary shaft to perform specimen dispensing from the specimen containers 5 to the reaction vessels 2. On a trajectory of the dispensing nozzle, there are a reagent aspirating position 6 and a specimen aspirating position 7 on the disc 3, a first dispensing position and a second dispensing position on the incubator 1, and cleaning tanks 12 and 13 for cleaning the dispensing nozzle. Since the dispensing tip 18 is used in the second dispensing mechanism 9, a dispensing tip mounting position 22 and a dispensing tip disposal position 23 also exist on the trajectory.

The first dispensing mechanism 8 and the second dispensing mechanism 9 are disposed such that the trajectory of the dispensing nozzle and mechanisms do not physically interfere with each other. After the specimen and the reagent are aspirated by the dispensing nozzle or the dispensing tip 18 mounted on the dispensing nozzle, the specimen and the reagent are stirred and mixed by an aspirating and dispensing operation of the dispensing nozzle or the dispensing tip 18 in the reaction vessel 2.

The reaction vessel 2 accommodating a reaction liquid in which a specimen and a reagent are mixed is managed at a predetermined temperature by the incubator 1, and a reaction is promoted for a predetermined time.

A spectrophotometer 15 for a biochemical examination is disposed around the incubator 1. The spectrophotometer 15 includes a light source and a detector, which are not shown, and measures absorbance of the reaction liquid by dispersing and detecting transmitted light obtained by irradiating the reaction liquid in which the specimen and the reagent are mixed with light.

A detection mechanism 16 for an immunological examination measures the reaction liquid that has been reacted in the incubator 1 for a predetermined time. In the immunological examination, there is a method based on a principle of electrochemical luminescence or chemiluminescence as a method for detecting a labeling substance, and a structure and physical properties of a labeled body or a detection region suitable for each method are selected, and an amount of luminescence derived from a luminescence reaction of the labeling body is measured using a photomultiplier tube as a detector.

The reaction vessel 2 whose absorbance has been measured in the incubator 1 is discarded into a dispensing tip/reaction vessel disposal box 21 by a dispensing tip/reaction vessel transport mechanism 17 (hereinafter, "transport mechanism"). Movement of the reaction vessel 2 containing the reaction liquid reacted for a predetermined time by the incubator 1 to the detection mechanism 16 and movement of the reaction vessel 2 whose measurement has been completed by the detection mechanism 16 to the dispensing tip/reaction vessel disposal box 21 are also performed by the transport mechanism 17.

The transport mechanism 17 moves the reaction vessel 2 containing the reaction liquid reacted for a predetermined time by the incubator 1 to the detection mechanism 16, moves the reaction vessel 2 whose measurement has been completed by the detection mechanism 16 to the dispensing tip/reaction vessel disposal box 21, also moves the reaction vessel 2 loaded in a reaction vessel tray 20 to the incubator 1, moves the reaction vessel 2 whose change in absorbance has been measured by the spectrophotometer 15 in the incubator 1 to the disposal box 21, moves the dispensing tip 18 loaded in a dispensing tip tray 19 to the dispensing tip mounting position 22, and the like.

The control unit 24 is connected to each mechanism (a state of connection is not shown), and controls rotational driving of the incubator 1, a rotational operation of the disc 3, driving of the dispensing nozzle, an operation of aspirating and dispensing a liquid, and the like.

FIG. 2 is a view showing an optical system of the automatic analyzer. The optical system includes a light source 101, a condenser lens 102, an irradiation slit 103, a reaction vessel 2, a light receiving slit 105, a concave diffraction grating 106, and a light receiver 107. Light from the light source 101 is condensed by the condenser lens 102, and an irradiation range is limited by the irradiation slit 103, after the light is incident on the reaction vessel 2, light of a light amount corresponding to absorbance of the reaction liquid 104 in the reaction vessel 2 is emitted, and a light receiving range is limited by the light receiving slit 105. The light is dispersed by the concave diffraction grating 106, and is received by the light receiver 107. Here, the absorbance is measured by converting the light amount for each wavelength of the received light into an electric signal.

Here, in order to measure the absorbance, two flat surfaces parallel to the reaction vessel are required. However, since the incubator is processed by cutting, it is difficult to form a rectangular hole and manufacturing cost increases. Rectangle can be formed by casting, die-casting, a lost-wax method, or the like, but dimensional accuracy is poorer than that of cutting and a gap between the reaction vessel and the disc is larger, which deteriorates accuracy of temperature control and a temperature rising rate. In addition, in casting, die-casting, and a lost-wax method, temperature uniformity deteriorates because a material contains a space (called "nest") not filled with the material due to gas generated during manufacturing.

In addition, in an immunoautomatic analyzer, a dispensing tip having a conical shape is used. Since the transport mechanism grips a cylindrical portion on an upper part of the dispensing tip, both of the dispensing tip and the reaction vessel are preferably cylindrical in order for the transport mechanism to transport both the dispensing tip and the reaction vessel.

Further, when the reaction vessel is formed in a square shape, the reaction vessel and an inside of a hole of the incubator cannot be in contact with each other well. When a contact area is reduced, heat from the incubator is less likely to be transferred to the reaction vessel, which leads to deterioration of temperature control performance.

Hereinafter, a reaction vessel for an automatic analyzer will be described in which a basic shape is a cylindrical shape and only a portion through which transmitted light passes is a flat surface, so that the light amount from the reaction liquid can be measured without significantly reducing a function of maintaining the reaction vessel at a predetermined temperature.

FIG. 3 shows an appearance and a cross section of a reaction vessel common to a biochemical examination and an immunoserum examination. As an example, the reaction vessel is made of a plastic material having a sufficient transmittance for a wavelength of light necessary for analysis, and has a cylindrical shape with a diameter d (for example, d=4 mm to 10 mm) and a total length e (for example, e=20 mm to 50 mm). An upper part of the reaction vessel is an opening part 51. A lower part of the reaction vessel is a bottom surface 53 having a hemispherical shape. Two facing flat surfaces 54, 55 are formed in a vicinity of the bottom surface 53, whose length in a longitudinal direction of the reaction vessel 2 (Z-axis direction) is f (for example, f=3 mm to 25 mm). A distance between the two flat surfaces 54 and 55 (hereinafter referred to as "optical path length") is g (for example, g=3 mm to 6 mm). For example, when e=24 mm, f=6 mm or less, that is, a length of the flat surface in the Z-axis direction is preferably less than ¼ of an overall length of the reaction vessel in the Z-axis direction, and a length of the flat surface in a short direction (X-axis direction) is preferably 3 mm or more (for example, when d=6 mm, g=4 mm).

The two facing flat surfaces 54 and 55 are substantially parallel to each other. Further, an upper limit position of the flat surface is in contact with a lower limit position of a transition region 56, and a lower limit position of the flat surface is a boundary with the bottom part 53 (a curvature occurs downward from the lower limit position). Although it is also possible to configure a whole with three or more flat surfaces to have a polygonal, in consideration of the fact that it is necessary to increase an area of a surface which is in close contact with the incubator 1 in order to improve the temperature control performance and cutting processing of the incubator which will be described later, a case where only the two facing flat surfaces are provided is the easiest while the temperature control performance is high.

The transition region 56 having a tapered shape is provided between a region on an opening part 51 side of the reaction vessel 2 and a region on a bottom part 53 side of the reaction vessel 2. An angle of a transition surface of the transition region 56 is set to an angle at which magnetic particles contained in the reaction liquid are not retained on the transition surface. The bottom surface 53 of the reaction vessel 2 may not have a hemispherical shape, and may be formed of a circular cone, a flat surface, or a combination thereof.

Since a solid component called a magnetic bead is contained in the reagent used in an immune item, an angle required for the transition region 56 is theoretically or experimentally determined so that the magnetic bead is not retained at a position other than the bottom surface even when the magnetic bead settles during the reaction, and the angle is set to the closest to horizontal within a range in which the magnetic bead is not retained in the transition region 56. That is, the temperature control performance can be improved by maximizing a region where the reaction vessel 2 and the incubator 1 are close to each other and a region where the reaction liquid and the incubator 1 are close to each other.

An upper part of the reaction vessel 2 is provided with a positioning portion 52 which has a wedge shape whose sharp portion facing a bottom surface side or a shape conforming thereto for positioning in the rotation direction, and insertion into holes 62 and positioning are finally performed by gravity in response to a positional deviation in the rotation direction and a height direction at the time of insertion of the reaction vessel 2 by the transport mechanism 17.

FIG. 4 shows an appearance and a cross section of the incubator 1. The incubator 1 is provided with the holes 62 in which the reaction vessels are held, and has a role of raising and maintaining the temperature of the reaction liquid in the reaction vessel 2 to a predetermined temperature, and slits 63, 64 for light to pass are opened in an optical path. Light from the light source 101 is emitted perpendicularly to the flat surface 54 (not emitted to the incubator 1 and a surface of the incubator 1 configuring the slits 63 and 64).

When there is a position to be used only for analysis of an item of an immune serum examination (immune item) which does not involve measurement of absorbance, the slits 63, 64 may not be provided on the optical path so as to improve the temperature control performance and eliminate a bad influence due to irradiation of a reagent of the immune item with strong light. In addition, the incubator 1 has a shape in which the holes 62 into which the reaction vessel is inserted are formed at equal intervals in an outer circumference portion of a disk-shaped metal, but the incubator 1 may not necessarily have a disk shape, and may not be made of a metal.

A shape of the hole 62 into which the reaction vessel is inserted is a shape conforming to an outer shape of the reaction vessel except for the two facing flat surfaces, that is, a cylindrical shape, and the bottom surface thereof is a hemisphere, a circular cone, a flat surface, or a combination thereof, and a dimension of the hole is configured to have a minimum size that allows smooth insertion of even the largest individuals within a variation of an external dimension of the reaction vessel so as to minimize thermal resistance between the incubator 1 and the reaction vessel. When the hole has the shape conforming to the outer shape of the reaction vessel except for the two facing flat surfaces, processing by cutting becomes easy, and the hole does not come into contact with the reaction vessel even when fine burrs remain at the time of processing the slits 63 and 64 of the incubator 1 since the hole is formed only in a rotationally symmetrical shape, so that smooth insertion can be realized without damaging the reaction vessel.

FIG. 5 shows a cross section of a state where the reaction vessel 2 containing the reaction liquid 65 is installed in the incubator 1. Incident light emitted from the light source and passing through the slit 63 on an incident side is incident on the flat surface 54, passes through the reaction liquid 65 in the reaction vessel 2, and light of a light amount corresponding to absorbance of the reaction liquid 65 is emitted from the facing flat surface 55. The emitted light passes through the slit 64 on an emission side, and is incident on the spectrophotometer to be dispersed, and the light amount for each wavelength is measured. Here, since the cylindrical portion of the reaction vessel 2 is in close contact with the incubator 1, heat is transferred from the incubator 1 controlled to a constant temperature to the reaction vessel 2 and the reaction liquid 65, and the temperature of the reaction vessel 2 is rapidly increased to the same temperature as that of the incubator 1. On the other hand, since the two flat surfaces 54 and 55 provided in the reaction vessel 2 are not in close contact with the incubator 1, the amount of heat transmitted from the two flat surfaces is small, and contribution to the temperature rise is small. Therefore, the highest temperature increasing performance can be obtained by making the flat surfaces provided in the reaction vessel 2 only the minimum two flat surfaces required for the absorbance measurement.

Regarding positions of upper ends of the two facing flat surfaces (boundaries between upper ends of the flat surfaces and the transition regions 56), the maximum value of the positional deviation of the light beam due to component dimensional tolerances is determined by accumulating tolerances or statistical methods in addition to the minimum necessary light beam theoretically or experimentally determined, and the two facing flat surfaces are set to have the smallest area within a range that can ensure a flat surface with a size obtained by adding the maximum value of the tolerance to the minimum necessary light beam. Accordingly, a contact area between the incubator and the reaction vessel can be maximized, and the temperature control performance can be improved. At this time, the minimum reaction liquid amount (total liquid amount of the specimen and the reagent) of the automatic analyzer using the reaction vessel is required to be set to an amount that can fill an entire flat surface and secure a liquid surface height that does not enter the light beam even when bubbles are formed on the liquid surface.

Similarly, regarding a width of the two facing flat surfaces, the two facing flat surfaces are set to have the minimum area within a range that can ensure a flat surface with a size obtained by adding the size of the light beam, a distance of movement during a time when the absorbance measurement is performed, the maximum value of the component dimensional error, and the error of the timing of the absorbance measurement, so that the temperature control performance can be improved.

According to the present embodiment, since the two flat surfaces arranged perpendicular to a light traveling direction (parallel to an XZ plane) are provided in a vicinity of the bottom part of the reaction vessel, the light amount can be measured by irradiating the flat surfaces with light. In addition, since portions on side surfaces of the two flat surfaces are formed to bend in a direction toward an outer side of the reaction vessel (have a cylindrical shape, which is the basic shape), and a length of the two flat surfaces in the Z-axis direction of the reaction vessel is less than half the overall length of the reaction vessel, a portion required as a light path is minimized and the temperature control performance is not degraded.

Hereinafter, variations of the present embodiment will be described. FIG. 6 is a view showing a conical reaction vessel whose diameter decreases from an upper end toward a bottom part. In this case, when optical path lengths are the same, the diameter of the upper part becomes larger, so that it is necessary to separate the adjacent reaction vessels from each other, and mounting density becomes low. In addition, since a ratio of a surface area to a volume of the reaction liquid decreases, the temperature control performance also deteriorates. However, there is an advantage that positioning margin of the transport mechanism 17 is improved.

Actually, it is difficult to realize a complete cylindrical shape as shown in FIG. 5. This is because, when the reaction vessel 2 is manufactured by injection molding of a plastic material, an inclination called a draft angle is required to remove the reaction vessel 2 from a gold mold. However, when the shape is as close to a cylinder as possible, for example, when the draft angle is 0.5 degrees or less, a difference in diameter between the upper part and the lower part of the reaction vessel is small, and even when an incubator side is made into a completely cylindrical shape, a hole shape of the incubator may be left as a cylinder because a gap at the lower part can be made sufficiently small. In this case, since the incubator can be processed by a general-purpose cutting tool, workability and productivity are improved.

FIG. 7 is a view showing a reaction vessel provided with a grip portion 57. The grip portion 57 is disposed between a region on an opening part 51 side and a region on a bottom part 53 side and closer to the opening part 51 side than the bottom part 53, a diameter of the reaction vessel 2 on an outer side is larger than a diameter of the opening part 51, and a boundary portion with the region on the opening part 51 side and a boundary part with the region on the bottom part 53 side are formed in a stepped shape.

By providing the grip portion 57 in which a diameter of a portion of a length h from the upper end is enlarged to i (i>d), it is possible to form a finger shape such that the transport mechanism 17 holds the reaction vessel 2 not depending only on a frictional force, and a risk of dropping the reaction vessel 2 on the device can be reduced. The grip portion 57 does not necessarily have to be provided downward from the upper end, and may be provided in an intermediate portion of the cylinder.

In the above embodiment, the material is a transparent plastic material, but the reaction vessel may also be made of a material having a light shielding property except for the two facing flat surfaces through which light passes. In this case, since light from an outer side is less likely to enter the optical path, it is possible to prevent a decrease in analysis accuracy due to stray light or scattered light derived from external light. Further, a reaction liquid is less likely to be affected by external light even for an immune item for which absorbance is not measured, so that the analysis accuracy can be improved for an item using a reagent that deteriorates in response to light.

FIG. 8 is a view showing a reaction vessel provided with a scratch-resistant frame. When a form of provision to a customer is to bag in units of hundreds to thousands without packing individual reaction vessels or loading the reaction vessels in magazines, a contact between the reaction vessels may damage a translucent surface through which light is transmitted, which may be determined as defective on the device and discarded, or may lead to poor analysis. For this reason, when the scratch-resistant frame 58 is provided such that an outer edge portion of the translucent surface extends not along the two facing flat surfaces but along a cylinder, a risk of damage to the translucent surface can be reduced. The scratch-resistant frame can be enlarged not only on an outer edge of the translucent surface but also in a range other than a necessary range in consideration of the light beam due to the design and the positional deviation of the light beam due to tolerance of a mechanical system (areas of the flat surfaces 54 and 55 on the outer surface can be made smaller than that of the flat surface 59 on an inner surface of the reaction vessel), and as an example, the outer surface can be cylindrical except for the optical path, as shown in FIG. 9. In this case, since the incubator and the reaction vessel can be brought into contact with each other even in the region of the two facing flat surfaces except for the optical path portion, the temperature control performance can be improved.

In the incubator 1, the shape of the hole into which the reaction vessel is inserted may be a shape that follows the outer shape of the reaction vessel with respect to the two facing flat surfaces. In a case of using a processing method without limitation due to processing and productivity as when cutting is used for processing, for example, when casting or injection molding is used, the temperature control performance can be improved by adopting a shape in which all surfaces including the two facing flat surfaces, except for the slits of the incubator, are brought into contact.

REFERENCE SIGN LIST 1 incubator
2 reaction vessel
3 reagent/specimen common disc
4 reagent bottle
5 specimen container
6 reagent aspirating position
7 specimen aspirating position
8 first dispensing mechanism
9 second dispensing mechanism
10 first dispensing mechanism pump
11 second dispensing mechanism pump
12 first dispensing nozzle cleaning tank
13 second dispensing nozzle cleaning tank
14 reagent stirring mechanism 15 spectrophotometer
16 detection mechanism
17 dispensing tip/reaction vessel transport mechanism
18 dispensing tip
19 dispensing tip tray
20 reaction vessel tray
21 dispensing tip/reaction vessel disposal box
22 dispensing tip mounting position
23 dispensing tip disposal position
24 control unit

The invention claimed is:

1. A reaction vessel with a cylindrical shape centered on a first axis which is used in an automatic analyzer for analyzing at least a part of a specimen using a process of measuring absorbance, an overall length in a first axis direction being longer than an overall length in a second axis direction and an overall length in a third axis direction, the second axis being perpendicular to the first axis and the third axis being perpendicular to the first axis and the second axis, the reaction vessel comprising:
an opening part which dispenses a liquid at a portion on one end side in the first axis direction;
a first flat surface which has one side extending in the first axis direction and the other side extending in the second axis direction from a portion on the other end side in the first axis direction; and
a second flat surface which is substantially parallel to the first flat surface at a portion facing the first flat surface in the third axis direction, wherein
portions on side surfaces of the first flat surface and the second flat surface are formed to bend in a direction toward an outer side of the reaction vessel, and
a length of the first flat surface and the second flat surface in the first axis direction is less than half the overall length in the first axis direction.

2. The reaction vessel according to claim 1, further comprising:
a first region which includes the opening part; and
a second region which is closer to a bottom part of the reaction vessel than the first region and includes the first flat surface and the second flat surface,
wherein in a case where the first flat surface is viewed from the third axis direction, two boundary lines of the reaction vessel and the outer side extending in the first axis direction in the second region are parallel to each other.

3. The reaction vessel according to claim 1, wherein the length of the first flat surface and the second flat surface in the first axis direction is equal to a sum of position error of irradiation light beams for absorbance measurement in a biochemical examination obtained based on magnitude of the irradiation light beams and component dimensional tolerance.

4. The reaction vessel according to claim 1, wherein upper ends of the first flat surface and the second flat surface are connected to a transition surface having an angle to the second axis direction.

5. The reaction vessel according to claim 4, wherein the angle of the transition surface is set to an angle at which magnetic particles contained in a reaction liquid are not retained on the transition surface.

6. The reaction vessel according to claim 1, wherein a diameter of the other end side in the first axis direction facing the opening part is smaller than a diameter of the opening part.

7. The reaction vessel according to claim 1, further comprising:
a protrusion which has a wedge shape whose sharp portion facing a bottom surface side, a chamfered wedge shape, or an arc shape on an outer side of a cylindrical portion of the reaction vessel.

8. The reaction vessel according to claim 1, further comprising:
a grip portion which is disposed between the first region and the second region and closer to the opening part than the bottom part, so that a diameter of the outer side of the reaction vessel is larger than the diameter of the opening part, and a boundary portion with the first region and a boundary portion with the second region are formed in a stepped shape.

9. The reaction vessel according to claim 1, wherein
the first flat surface which has the one side extending in the first axis direction and the other side extending in the second axis direction from the portion on the other end side in the first axis direction is only on a cylindrical inner surface,
the second flat surface which is substantially parallel to the first flat surface at the portion facing the first flat surface in the third axis direction is only on the cylindrical inner surface, and
two facing flat surfaces having an area smaller than the first flat surface and the second flat surface are on a cylindrical outer surface facing the first flat surface and the second flat surface.

10. The reaction vessel according to claim 1, wherein the first flat surface and the second flat surface are made of a resin material that transmits light, and portions other than the first flat surface and the second flat surface are made of a resin material that does not transmit light.

11. The reaction vessel according to claim 1, wherein the length of the first flat surface and the second flat surface in the first axis direction is less than ¼ of the overall length in the first axis direction.

12. The reaction vessel according to claim 1, wherein the portion on the other end side in the first axis direction is formed in a hemispherical shape.

13. The reaction vessel according to claim 1, wherein the reaction vessel is used in a composite automatic analyzer that enables a biochemical examination and an immunological examination.

14. An automatic analyzer that analyzes a specimen using a reaction vessel with a cylindrical shape centered on a first axis, the automatic analyzer comprising:
an incubator configured to manage the reaction vessel at a predetermined temperature and promote a reaction of a mixture of a reagent and a specimen in the reaction vessel; and
a spectrophotometer configured to emit light to the reaction vessel and measure absorbance of a reaction liquid in the reaction vessel based on light transmitted through the reaction vessel, wherein
the incubator is provided with a hole in which the reaction vessel is accommodated,
the reaction vessel is formed such that an overall length in the first axis direction is longer than an overall length in a second axis direction and an overall length in a third axis direction, the second axis being perpendicular to the first axis and the third axis being perpendicular to the first axis and the second axis, and the reaction vessel includes: an opening part which dispenses a liquid at a portion on one end side in the first axis direction; a first flat surface which has one side extending in the first axis direction and the other side extending in the second axis direction from a portion on the other end side in the first axis direction; and a second flat surface which is substantially parallel to the first flat surface at a portion facing the first flat surface in the third axis direction, portions on side surfaces of the first flat surface and the second flat surface being formed to bend in a direction toward an outer side of the reaction vessel, and a length of the first flat surface and the second flat surface in the first axis direction being less than half the overall length in the first axis direction, translucent surfaces that transmit light emitted from the spectrophotometer are formed on an inner wall of the hole at a portion facing the first flat surface and a portion facing the second flat surface, and an outer wall of the reaction vessel is formed such that portions expect for the first flat surface and the second flat surface are in close contact with the inner wall of the hole when the reaction vessel is accommodated in the hole.

15. The automatic analyzer according to claim 14, wherein the incubator includes:
- a first hole in which a reaction vessel for a biochemical examination is accommodated; and
- a second hole in which a reaction vessel for an immunological examination is accommodated, and
- a slit facing the translucent surface is formed on an inner wall of the first hole, and the slit is not formed on an inner wall of the second hole.

16. The automatic analyzer according to claim 15, wherein a length of the first flat surface and the second flat surface in the first axis direction is less than ¼ of the overall length in the first axis direction.

17. The automatic analyzer according to claim 15, wherein the portion on the other end side in the first axis direction is formed in a hemispherical shape.

18. The automatic analyzer according to claim 14, wherein a length of the first flat surface and the second flat surface in the first axis direction is less than ¼ of the overall length in the first axis direction.

19. The automatic analyzer according to claim 14, wherein the portion on the other end side in the first axis direction is formed in a hemispherical shape.

* * * * *